(12) United States Patent
Hecker et al.

(10) Patent No.: US 8,084,557 B2
(45) Date of Patent: Dec. 27, 2011

(54) GAS-PHASE PROCESS FOR THE POLYMERIZATION OF ALPHA-OLEFINS

(75) Inventors: Manfred Hecker, Naustadt (DE); Markus Schopf, Bonn (DE); Axel Hamann, Kerpen (DE); Paulus-Petrus Maria de Lange, Wesseling (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 12/735,014

(22) PCT Filed: Dec. 18, 2008

(86) PCT No.: PCT/EP2008/010823
§ 371 (c)(1),
(2), (4) Date: Sep. 7, 2010

(87) PCT Pub. No.: WO2009/077185
PCT Pub. Date: Jun. 25, 2009

(65) Prior Publication Data
US 2010/0331502 A1 Dec. 30, 2010

Related U.S. Application Data

(60) Provisional application No. 61/189,675, filed on Aug. 21, 2008.

(30) Foreign Application Priority Data

Dec. 18, 2007 (EP) .................................... 07024498

(51) Int. Cl.
*C08F 2/34* (2006.01)
*C07C 7/09* (2006.01)

(52) U.S. Cl. .......... 526/77; 526/901; 585/251; 585/518; 585/818

(58) Field of Classification Search .................... 526/77, 526/901; 585/251, 518, 818
See application file for complete search history.

(56) References Cited

U.S. PATENT DOCUMENTS

| | | | |
|---|---|---|---|
| 5,324,800 A | 6/1994 | Welborn, Jr. et al. | |
| 5,556,928 A | 9/1996 | Devore et al. | |
| 5,907,076 A * | 5/1999 | Ou et al. | 585/800 |
| 6,278,033 B1 * | 8/2001 | Flick et al. | 585/262 |
| 6,987,152 B1 | 1/2006 | Eisinger et al. | |

FOREIGN PATENT DOCUMENTS

| | | |
|---|---|---|
| EP | A-0004645 | 10/1979 |
| EP | A-0089691 | 9/1983 |
| EP | A-0120503 | 10/1984 |
| EP | A-0129368 | 12/1984 |
| EP | A-0208515 | 1/1987 |
| EP | A-0241947 | 10/1987 |
| EP | A-0416815 | 3/1991 |
| EP | A-0420436 | 4/1991 |
| EP | A-0485820 | 5/1992 |
| EP | A-0485822 | 5/1992 |
| EP | A-541760 | 12/1992 |
| EP | A-0643066 | 3/1995 |
| EP | A-0671404 | 9/1995 |
| EP | A-0695313 | 2/1996 |
| EP | A-1040128 | 10/2000 |
| WO | WO-A-91/04257 | 4/1991 |
| WO | WO 94/28032 | 12/1994 |
| WO | WO 95/22565 | 8/1995 |
| WO | WO 96/22995 | 8/1996 |
| WO | WO 98/22489 | 5/1998 |
| WO | WO 99/24446 | 5/1999 |
| WO | WO 99/58539 | 11/1999 |
| WO | WO 03/014169 | 2/2003 |

OTHER PUBLICATIONS

Product brochure on UOP MOLSIV Molecular Sieves (2 pages), 2006.*
"Engine Oil Licensing and Certification System," *American Petroleum Institute*, API Publication 1509, 14th Edition, Dec. 1996, Addendum 1, Dec. 1998, pp. E1-E10.
M. P. McDaniel, "Supported Chromium Catalysts for Ethylene Polymerization," *Advances in Catalysis*, vol. 33, pp. 47-98, 1985.

* cited by examiner

Primary Examiner — Fred M Teskin
(74) Attorney, Agent, or Firm — Dilworth IP, LLC

(57) ABSTRACT

A continuous gas-phase process for the polymerization of alpha-olefins, in particular ethylene, comprising passing an alpha-olefin monomer stream through an oil filter in order to reduce the amount of oil to less than 8 ppm, and polymerizing the thus purified monomer feed in gas-phase reactor; the reduction of the amount of oil improves the operability of the plant over time.

21 Claims, 2 Drawing Sheets

GAS-PHASE PROCESS FOR THE POLYMERIZATION OF ALPHA-OLEFINS

CROSS-REFERENCE TO RELATED APPLICATIONS

This application is the U.S. national stage under 35 U.S.C. §371 of International Application PCT/EP2008/010823, filed Dec. 18, 2008, claiming priority to EP Patent Application No. 07024498.3, filed Dec. 18, 2007, and provisional U.S. Appl. No. 61/189,675, filed Aug. 21, 2008; the disclosures of International Application PCT/EP2008/010823, EP Patent Application No. 07024498.3, and provisional U.S. Appl. No. 61/189,675, each as filed, are incorporated herein by reference.

FIELD OF THE INVENTION

The present invention concerns a gas-phase olefin polymerization process, in particular a gas-phase process for the polymerization of ethylene, wherein the olefin feed is purified before polymerization in order to almost eliminate oil impurities present therein.

BACKGROUND OF THE INVENTION

Polyethylene is one of the most common thermoplastic polymers, used in a wide range of applications, and it is produced using ethylene as a monomer. Ethylene is generally produced via cracking of crude oil derivatives; in fact, it is common to find petrochemical complexes where the refinery, cracker and polymer plant are located on a single site. This is also due to the fact that polyethylene production requires quite high capital investments, while the final consumer product is commonly sold at relatively low price. Hence, improving polymer production techniques in order to reduce the manufacturing costs continues to be an important area of research, development and process improvement.

Various technologies for the production of polyethylene are commercially available; among these, gas-phase polymerization processes are the latest technologies developed, and are commonly employed in the production of high density polyethylene (HDPE), medium density polyethylene (MDPE) and linear-low density polyethylene (LLDPE). In gas-phase polymerization processes, olefin polymerization is carried out in a gaseous medium in the presence of a solid catalyst based on a transition metal compound belonging to the groups IV, V or VI of the periodic table, and suitable cocatalysts.

An example of said gas-phase polymerization processes involves the use of a fluidized bed reactor, wherein a bed of polymer particles is maintained in a fluidized state by the upward flow of gaseous monomer. The reactor generally consists of a reaction zone, in which the polymer particles are maintained in a fluidized state by passing a gaseous reaction mixture containing olefin(s) and optionally an inert gas through a bed of polymer particles. The catalyst is introduced in the reactor and the polymer constituting the fluidised bed is also removed.

A gas distribution grid placed in the lower part of the reactor under the reaction zone is the means through which the fluidisation gas is sent through the polymer bed and is used to support the bed itself when the polymerization is discontinued.

The gaseous mixture, comprising monomers, comonomers, inert gas and molecular weight regulators, leaving the top of the reactor is sent to the reactor at a point below the gas distribution grid through a recycling line. Devices for the compression and cooling of the gases are generally arranged on said recycling line. Make-up monomers are usually fed in the gas recycling line in such a way to have a certain homogeneity of the gaseous mixture inside the reactor.

In industrial gas-phase processes, it has often been observed that plant operability increasingly reduces with time, rendering the process non-economical after a few years due to more frequent maintenance needs. The reduced operability is commonly accompanied by an increase in electrostatic charges in the reactor, and by the consequent formation of lumps. In fact, as a result of electrostatic forces, the catalyst and the polymer particles tend to adhere to the reactor walls. If the polymer remains in a reactive environment for a long time, excess temperature can result in particle fusion with the formation of sheets or layers of thin fused agglomerates in the granular product. There is a strong correlation between sheeting and the presence of excessive electrostatic charges (either negative or positive). This is evidenced by sudden changes in electrostatic levels followed closely by deviation in temperature at the reactor wall. The temperature deviations indicate particle adhesion, which causes an insulating effect and poorer heat transfer from the bed temperature. As a result, there is generally disruption in the fluidization patterns, catalyst feed interruption can occur, as well as plugging at the product discharge system.

There are numerous causes for the formation of electrostatic charges, including the friction of dissimilar materials, a limited static dissipation and an excessive catalyst activity.

The decrease in operability may also be due to the presence of poisons in the catalyst system (e.g., in the catalyst support, the catalyst itself or the co-catalyst), the presence of contaminants in solvents or additives used during the polymerization reaction, or the presence of contaminants in the reactant feeds, such as monomer or hydrogen feeds.

The presence of contaminants and poisons generally lead to a decrease in process efficiency and plant productivity, both for the need of stopping the production for cleaning the plant, and for the reduced polymerization rate. Moreover, such contaminants may affect the specifications of products.

Acetylene, carbon monoxide and carbon dioxide are by-products of the pyrolysis process to make ethylene; while the high pressure and slurry polymerization processes are much less affected by them, gas-phase polymerization processes, and in particular fluidized bed processes, are very sensitive to these poisons which, even in small amounts, are able to reduce significantly the polymerization rate.

To ensure that ethylene feeds are free of poisons, an ethylene purification train comprising a series of catalytic beds is commonly used to remove e.g. acetylene, carbon monoxide and oxygen, followed by molecular sieves to remove moisture and carbon dioxide. For the same reason, comonomers also require a purification step. Comonomers are usually degassed by means of a stripper column and dried on molecular sieves. The purification train poses a capital investment cost and operating costs that are incurred to a much lower extent in high pressure and slurry processes.

Therefore, it would be desirable to develop a gas-phase polymerization process able to guarantee a constant operability and production levels of the polymerization plants over long service times, without the need for time consuming and expensive plant shutdowns for maintenance services.

SUMMARY OF THE INVENTION

The Applicant has unexpectedly found that, by reducing the amount of oil to very low levels in the monomer feed to a gas-phase polymerization process, the operability of the plant may be improved and maintained constant over time, thus eliminating the problems indicated above and consequently improving the quality of the polymer.

An object of the present invention is a continuous gas-phase process for the polymerization of alpha-olefins, comprising the following steps:
(a) passing a stream comprising one or more alpha-olefin monomers through an oil filter, to obtain a monomer feed comprising an amount of oil lower than 8 ppm; and
(b) continuously passing the monomer feed obtained from step (a) through a gas-phase reactor in the presence of a polymerization catalyst, under polymerization conditions.

Alpha-olefin monomers have preferably formula $CH_2=CHR$, where R is hydrogen or alkyl, cycloalkyl or aryl radical having 1 to 12 carbon atoms. The gas-phase reactor is preferably a fluidized-bed reactor.

According to a preferred embodiment of the invention, before conducting the polymerization step (b), the monomer feed obtained from step (a) is further treated in one or more monomer purification units to reduce the presence of acetylene to an amount lower than 10 ppm, CO to an amount lower than 10 ppm, $H_2O$ to an amount lower than 10 ppm, and $CO_2$ to an amount lower than 15 ppm.

A further object of the invention is a continuous gas-phase process for the homo or co-polymerization of alpha-olefin monomers comprising the following steps:
(1) passing a stream containing one or more alpha-olefin monomers through an oil filter to obtain a monomer stream comprising an amount of oil lower than 8 ppm;
(2) passing the monomer stream obtained from step (1) through a catalytic purification unit under hydrogenating conditions, to obtain a monomer stream comprising an amount of acetylene lower than ppm;
(3) passing the monomer stream obtained from step (2) through a catalytic purification unit under oxidative conditions, to obtain a monomer stream comprising an amount of CO lower than 10 ppm;
(4) treating the monomer stream obtained from step (3) with molecular sieves in order to obtain a monomer stream comprising an amount of $H_2O$ lower than 10 ppm, and an amount of $CO_2$ lower than ppm; and
(5) continuously passing the monomer stream obtained from step (4) through a gas-phase reactor in the presence of a polymerization catalyst, under polymerization conditions.

A further object of the present invention concerns the use of an oil filter to obtain a purified alpha-olefin monomer stream comprising an amount of oil lower than 8 ppm, wherein the purified monomer stream is then used as monomer feed in a continuous gas-phase polymerization process.

Finally, a further object of the present invention is the use of a gaseous stream comprising on or more alpha-olefin monomers, preferably ethylene, as a monomer feed in a continuous gas-phase polymerization process, wherein the gaseous stream contains an amount of oil lower than 8 ppm.

DETAILED DESCRIPTION OF THE INVENTION

Figure 1:
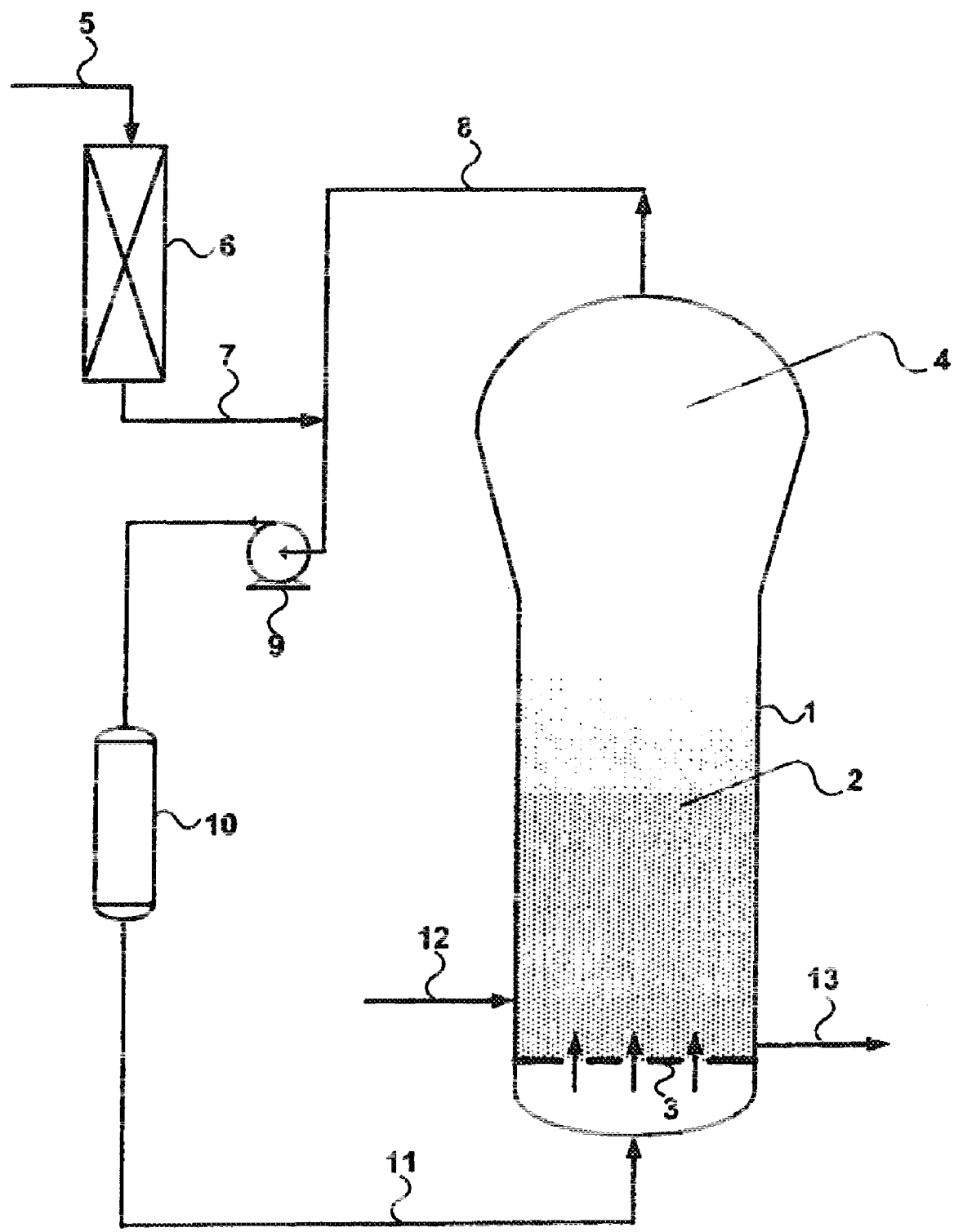
FIG. 1 illustrates a fluidized bed reactor comprising an oil filter according to the present invention in the monomer feeding line.

The process of the present invention comprises the purification of the monomer feed to a continuous gas-phase polymerization process, in order to reduce the presence of oil to an amount lower than 8 ppm; the oil filter used in step (a) preferably reduces the presence of oil to an amount lower than 5 ppm, more preferably lower than 1 ppm, and even more preferably comprised between 0.001 and to 0.8 ppm.

By "ppm" is meant herewith part per million by volume, if not stated differently.

By "oil" it is meant an oil base stock that may be produced by different processes, such as distillation, solvent refining, hydrogen processing, oligomerization, esterification, and rerefining. The oil may be derived from natural oils, synthetic oils or mixtures thereof. Mineral oils include paraffinic and naphthenic oils; synthetic oils include oils prepared from the polymerization of ethylene, polyalphaolefin (PAO), or from hydrocarbon synthesis procedures using carbon monoxide and hydrogen gases, such as in a Fisher-Tropsch process.

According to a preferred embodiment, such oil is a lubricating oil, natural or synthetic, having a kinematic viscosity at 100° C. of 0.04 $cm^2/s$ (4cSt) to 0.3 $cm^2/s$ (30 cSt). The lubricating oil may have a molecular weight Mw of 200 to 1500 and a boiling range higher than 560° C. Lubricating oils include those in all API categories I, II, Ill, IV and V as defined in API Publication 1509, 14th Edition, Addendum I, December 1998.

Natural lubricating oils may include animal oils, vegetable oils (e.g., rapeseed oils, castor oils and lard oil), petroleum oils, mineral oils, and oils derived from coal or shale.

Synthetic oils may include hydrocarbon oils and halo-substituted hydrocarbon oils such as polymerized and interpolymerized olefins, alkylbenzenes, polyphenyls, alkylated diphenyl ethers, alkylated diphenyl sulfides, as well as their derivatives. Synthetic lubricating oils also include alkylene oxide polymers, interpolymers, copolymers and derivatives thereof wherein the terminal hydroxyl groups have been modified by esterification, etherification, etc. Another class of synthetic lubricating oils comprises the esters of dicarboxylic acids with a variety of alcohols, including those made from $C_5$ to $C_{12}$ monocarboxylic acids and polyols and polyol ethers, as well as tri-alkyl phosphate ester oils. Other synthetic lubricating oils comprise silicon-based oils (such as the polyalkyl-, polyaryl-, polyalkoxy-, or polyaryloxysiloxane oils and silicate oils) and liquid esters of phosphorus-containing acids, polymeric tetrahydrofurans and polyalphaolefins.

The oil filter may be any filter able to remove oil from a monomer stream, and is preferably a demister or a liquid/gas coalescer. Demisters use the separation mechanism of inertial impaction, which occurs when a gas containing an oil aerosol passes through a retention material, such as fibers and impingement barriers; while the gas stream follows a path around the fibers or barriers, the oil droplets tend to impact on them, thus loosing velocity, coalescing and remaining trapped in the retention material or falling on the bottom of the vessel, where they are removed.

The demister comprises a retention material bed, which is inert to the gas-phase polymerization catalyst bed, and is preferably able to trap oil droplets having a diameter higher than 5 micron, and even more preferably higher than 1 micron.

The retention material may be a ceramic material, optionally reticulated, in the form of pellets, rings, saddles or spheres, which are effective in trapping or filtering the oil. The ceramic material preferably comprises inorganic oxides, and even more preferably one of more of alumina, silica, silica-alumina, magnesia, silica-magnesia or titania. The ceramic material may also comprise a zeolite.

The retention material may also be coated or impregnated with one or more conventional catalysts, such as a Group VI-B metal (preferably chromium, molybdenum or tungsten) or a Group VIII metal (preferably iron, cobalt, nickel, platinum, palladium or iridium).

The retention material may also undergo conventional surface treatments, so that the surface energy of the retention material is lower than the surface tension of oil. In fact, the demister is designed to maximize efficiency while preventing oil reentrainment, which occurs when the oil droplets accumulated on a demister element exit with the gas flow. In order to improve drainage, the retention material may be chemically treated to lower its surface energy, according to methods known in the art.

According to a further embodiment of the invention, the oil filter is a liquid/gas coalescer, which also acts according to the separation mechanism of inertial impaction. The liquid/gas coalescer is preferably able to trap oil aerosols, where the oil droplets have a diameter higher than 0.3 micron, and more preferably higher than 0.1 micron.

Coalescers which are useful in the processes of the invention preferably comprise a filter medium, preferably a fibrous medium made from organic or inorganic fibers. Exemplary organic microfibers include those made from polyolefins (such as polyethylene, polypropylene, polymethylpentane, polyisobutylene and copolymers thereof), polyesters (such as polybutylene terephthalate and polyethylene terephthalate), polyamides (such as polyhexamethylene adipamide, polyhexamethylene sebacamide, nylon 11 and nylon 6) and mixtures thereof.

Suitable inorganic fibers include glass fibers and metal titanate fibers, e.g., potassium titanate fibers.

The fibers may have a diameter ranging from 0.1 to 20 micrometers, and preferably 0.5 to 15 micrometers; the median length to diameter ratio of the fibers (aspect ratio) may range from 500 to 1,000, and preferably from 600 to 900.

The surface properties of the filter medium may be modified by any of a number of well-known surface-modifying or treating agents to lower its surface energy. Particularly preferred treating agents are perfluorinated compounds, as defined in EP-A-208515. The surface-modifying agent may be applied to the filter medium or to a preformed structure, e.g., a filter cartridge, by a post-treatment of the formed medium or structure, for example, by dipping it, spraying it, roller coating it, or otherwise contacting the preformed medium or structure with a solution or dispersion of the surface-modifying agent. In the case of a fibrous filter medium prepared from a slurry of fibers, the surface-modifying agent may be admixed into the slurry prior to laydown and formation of a filter medium. After the composite medium has been treated, e.g., by impregnation, spraying or roller coating the dilute treating agent onto the structure, it is then dried.

The filter medium can have a variety of forms, including those of conventional coalescing filter structures, for example, discs, flat panels, and pleated or unpleated cylinders. They may also comprise simple or composite media. The coalescer may be in the form of a cartridge, comprising a series of separation plates; a suitable cylindrical filter design is described in EP-A-208515.

The reduction of the amount of oil to levels lower than 8 ppm in the monomer feed to a gas-phase polymerization process unexpectedly solve the problems of the prior art linked to the operability of the plant; in fact, the process of the invention increases the run time of the polymerization reactor as well as the life of the catalyst and the molecular sieve bed in the purifications unit, thus lowering operating costs.

Without wishing to be bound by theory, it is believed that oil, deriving for instance from the lubricants used in compressors to lubricate cylinders, gets into the discharge gas and contaminate it. Such oil partly passes unchanged to the polymerization reactor, partly remains in the purification columns, and partly reacts in the various catalytic purification units commonly used to purify the alpha-olefin stream and is oxidized to polar contaminants. It is believed that the removal of oil from the monomer feed prevents the reacting, cracking and oxidation of oil to polar components, which may adversely influence the polymerization reaction. Moreover, oil traces can act as poison for the polymerization catalyst too.

The oil filter may be located at the inlet of the gas-phase polymerization reactor, optionally before or after one or more purification units; according to a preferred embodiment, the oil filter of step (a) is followed by one or more purification units before the inlet of the gas-phase reactor of step (b).

According to the invention, the gaseous stream which is continuously passed through the fluidized bed comprises one or more alpha-olefin monomers. Suitable alpha-olefin monomers are those of formula $CH_2=CHR$, where R is hydrogen or alkyl, cycloalkyl or aryl radical having 1 to 12 carbon atoms.

The alpha-olefin monomer is preferably ethylene, and it may be homopolymerized or copolymerized with one or more comonomers, such as 1-propylene, 1-butene, 1-pentene, 1-hexene and 1-octene, as well as conjugated and non-conjugated diolefins, such as butadiene, 1,3-pentadiene, 2,3-dimethylbutadiene, 1,4-pentadiene, 1,5-hexadiene and vinylcyclohexene. According to a preferred embodiment, ethylene is copolymerized with 1-hexene.

When ethylene is copolymerized, the comonomers are preferably added to ethylene in an amount necessary to obtain ethylene copolymers comprising 88 to 99.8% by weight of ethylene and 0.2 to 12% by weight of comonomers.

The monomer gaseous stream can also include one or more alkanes or cycloalkanes as inert condensable gases; preferably $C_3$-$C_8$ alkanes or cycloalkanes are used as inert condensable gases, and more preferably propane, butane, pentane or hexane. Other inert gases, such as for example nitrogen, methane and ethane, can be used; hydrogen may be used as a chain transfer agent in order to regulate the molecular weight of the polymer.

In the process of the invention, the gas phase reactor may comprise one or more fluidized or mechanically agitated bed reactors; preferably, the gas-phase reactor is a fluidized-bed reactor, comprising a bed of polymer particles and catalytic particles maintained in a fluidized state by the upward flow of gaseous monomer. A distribution plate may dispense the fluidizing gas to the bed, and act as a support for the bed when the supply of gas is cut off. The polymer product may be withdrawn from the reactor via a discharge conduit arranged in the lower portion of the reactor near the distribution plate.

The heat of polymerization may be removed by feeding to the polymerization reactor a recycle gas stream at a temperature lower than the desired polymerization temperature; such a gas stream, while passing through the fluidized bed, allows conducting away the heat of polymerization. The recycle gas stream may be withdrawn from the upper zone of the reactor, cooled by passage through an external heat exchanger and then recycled to the reactor. The temperature of the recycle gas can be adjusted in a heat exchanger to maintain the fluidized bed at the desired polymerization temperature. According to this method of reactor cooling, the recycle gas stream generally comprises, besides the gaseous monomers, also inert and diluent gases, such as nitrogen, isopentane, hexane, propane, and gaseous chain transfer agents, such as hydrogen. Thus, the recycle gas stream serves to supply the monomer to the bed, to fluidize the bed and also to maintain the bed at the desired temperature.

The recycle gas stream can be cooled to a temperature below the dew point of the recycle gas stream to produce a two-phase gas/liquid mixture under conditions such that the liquid phase of said mixture will remain entrained in the gas phase of said mixture; the heat of polymerization may be removed by introducing said two-phase mixture into the reactor at a point in the lower region of the reactor, most preferably at its bottom, and the evaporation of the liquid phase takes place inside the polymerization bed, thus operating in "condensing mode", as described in EP-A-89691 and EP-A-241947. In the condensing mode, the quantity of condensed liquid contained in the gas phase is preferably lower than 20% by weight of the total amount of liquid and gas, and more preferably lower than 12% by weight. The condensed liquid comes from the condensable monomers, e.g. propylene, butene-1, hexene-1, octene and the inert condensable gases, e.g. propane, butane, pentane or hexane.

The process of the invention is operated with a gas velocity in the fluidised bed which must be greater or equal to that required for the fluidisation of the bed. The polymerisation is preferably carried out by using a gas velocity in the range 40 to 100 cm/sec, more preferably 50 to 80 cm/sec.

Monomers consumed by the polymerization reaction may be replaced by adding make-up gas to the recycle gas stream. The make-up monomer or monomers are fed to the bed in an amount approximately equal to the amount of polymer produced.

A suitable gas phase fluidized-bed reactor is described in EP-A-1040128. The reactor may be a long tube, through which recirculated reactor gas flows. In order to avoid entrainment of particulate polymer from the polymerization zone into the gas system, the gas-phase fluidized-bed reactor may exhibit, at the top, a steadying zone of greater diameter, which reduces the velocity of the recycled gas. The velocity of the recycled gas in the steadying zone is preferably reduced to one third-one sixth of the velocity of the recirculated gas in the polymerization zone.

Following its emergence from the gas-phase fluidized-bed reactor, the recirculated reactor gas is fed to a gas compressor and a gas condenser; afterwards, the cooled and compressed recycled gas is re-introduced into the agitated bed of bulk material of the gas-phase fluidized-bed reactor via a gas distributor plate, which ensures an homogeneous distribution of the gas phase and a consequent thorough mixing of the bed of bulk material.

The polymerization may be carried out at a pressure of between 1 and 100 bar, preferably from 10 to 80 bar, and more preferably from 15 to 50 bar. The polymerization is generally carried out at a temperature lower than the polymer sintering temperature, preferably comprised between 30 and 130° C., and more preferably between 70 and 120° C.

The homo or copolymer produced by the process of the invention can be removed from the gas-phase fluidized-bed reactor in conventional manner, for instance by simply opening a ball stop-cock in an outlet pipe leading to a let-down tank; in this case the pressure in the let-down tank is kept as low as possible to enable transport to be effected over longer distances and in order to free the polymers from adsorbed hydrocarbons, such as residual monomers during this removal stage. Then, in the let-down tank, the polymers can be purified further by purging with ethylene, nitrogen or propane, for example.

The residual monomers that are thus desorbed and the introduced purging medium can be fed to a conventional condensing step, in which they are separated from each other-advantageously under standard pressure and at lower temperatures.

The liquid residual monomers are generally fed directly back to the bed of bulk material, but the ethylene used for purging and any gases that are still present can be compressed in a conventional compressor for recirculated gases and then returned to the recirculated reactor gas.

The polymers that are present in the let-down tank can be further transported to a deodorizing or deactivating tank, in which they can be subjected to conventional treatment, for instance with nitrogen and/or steam.

The process according to the present invention can be used for preparing homopolymers and copolymers of alpha-olefins of formula $CH_2=CHR$, where R is hydrogen or alkyl, cycloalkyl or aryl radical having 1 to 12 carbon atoms, such as high density polyethylene, medium density polyethylene, linear low density polyethylene, polypropylene, random copolymers of ethylene and propylene, and of ethylene or propylene with other alpha-olefins, ethylene-propylene rubbers, ethylene-propylene-diene rubbers and heterophasic copolymers.

More preferably, the process of the invention is suitable for the manufacture of polyethylene having a density of from 0.87 to 0.97 $g/cm^3$, and more preferably high density polyethylene (HDPE) with a density ranging from 0.944 to 0.958 $g/cm^3$, or medium density polyethylene (MDPE) with a density ranging from 0.932 to 0.939 $g/cm^3$.

HDPE and MDPE are particularly useful in blow moulding applications (e.g. for producing containers and tanks), as well as in the manufacturing of pipes and films.

The polymerization step is carried out in the presence of a polymerization catalyst, and is not restricted to the use of any particular family of polymerization catalysts. The catalyst may be supported or unsupported, and optionally in pre-polymerized form. The polymerization reaction may be carried out in the presence of one or more Chromium catalysts, Ziegler-Natta catalysts, Vanadium based catalysts and/or single-site catalysts.

Suitable Chromium catalysts, also known as Phillips catalysts, for the preparation of polyolefins, are the ones described in M. P. McDaniel: Chromium Catalysts for Ethylene Polymerisation in Advances in Catalysis Vol. 33. Generally, all supported chromium catalysts can be used in the process of the invention.

Particularly suitable support materials are inorganic compounds, especially porous oxides such as $SiO_2$, $Al_2O_3$, MgO, $ZrO_2$, $B_2O_3$, CaO, ZnO or mixtures of these oxides. The support materials preferably exhibit a particle size between 1 and 300 μm, particularly from 30 to 70 μm. Examples of particularly preferred supports are silica gels and alumosilicate gels, preferably those of the formula $SiO_2aAl_2O_3$, in which a stands for a number ranging from 0 to 2, preferably from 0 to 0.5; these are thus alumosilicates or silicon dioxide. Such products are commercially available, for example as Silica Gel SG332 sold by Grace.

Preferred catalysts are based on a support material having a pore volume of from 1.0 to 3.0 mL/g, preferably from 1.6 to 2.2 mL/g and more preferably from 1.7 to 1.9 mL/g, and a surface area (BET) of from 200 to 500 $m^2/g$ and preferably from 300 to 400 $m^2/g$.

Doping of the catalyst support with the active component containing chromium preferably takes place from a solution or, in the case of volatile compounds, from the vapor phase. Suitable chromium compounds are chromium(VI) oxide, chromium salts such as chromium(III) nitrate and chromium (III) acetate, complex compounds such as chromium(III) acetylacetonate or chromium hexacarbonyl, or alternatively organometallic compounds of chromium such as bis(cyclopentadienyl)chromium(II), organic chromic esters or bis (aren)chromium(0). Cr(III) nitrate is preferably used.

The support is generally loaded by contacting the support material, in a solvent, with a chromium compound, removing the solvent and calcining the catalyst at a temperature of from 400° to 1100° C. The support material can for this purpose be suspended in a solvent or in a solution of the chromium compound.

In addition to the chromiferous active component, other doping substances can be applied to the support system. Examples of suitable such doping substances are compounds of boron, fluorine, aluminum, silicon, phosphorus and titanium. These doping substances are preferably applied to the support together with the chromium compounds but can alternatively be applied to the support in a separate step before or after the application of chromium. Examples of solvents suitable for use when doping the support are water, alcohols, ketones, ethers, esters and hydrocarbons, methanol being particularly suitable.

The concentration of the doping solution is generally from 0.1 to 200, preferably from 1 to 50, grams of chromium compound per liter of solvent.

The ratio by weight of chromium compounds to the support during application is generally from 0.001:1 to 200:1, preferably from 0.005:1 to 100:1.

According to one embodiment of the process of the invention, the chromium catalyst is prepared by adding small amounts of MgO and/or ZnO to the inactive pre-catalyst and subsequently activating this mixture in conventional manner. This measure improves the electrostatic properties of the catalyst.

For activation, the dry pre-catalyst is calcined at temperatures between 400° C. and 1100° C., for example in a fluidized-bed reactor in an oxidizing atmosphere containing oxygen. Cooling preferably takes place under an inert gas atmosphere in order to prevent adsorption of oxygen. It is also possible to carry out this calcination in the presence of fluorine compounds, such as ammonium hexafluorosilicate, by which means the catalyst surface is modified with fluorine atoms.

Calcination of the pre-stage preferably takes place in a gas-phase fluidized bed. According to one preferred embodiment, the mixture is first heated to from 200° C. to 400° C., preferably from 250 to 350° C., with fluidization thereof by pure inert gas, preferably nitrogen, which is subsequently replaced by air, whereupon the mixture is heated to the desired end temperature. The mixture is kept at the end temperature for a period of from 0 to 50 hours, preferably from 2 to 20 hours, and more preferably from 5 to 15 hours, after which the flow of gas is switched back to inert gas, and the mixture is cooled.

Chromium catalysts can also comprise suitable cocatalysts normally used in the art, such as organoaluminum compounds. Chlorine-free organoaluminum compounds are preferred cocatalysts, such as aluminum trialkyls $AlR'_3$ or dialkylaluminum hydrides of the formula $AlR'_2H$, where R' is an alkyl radical having from 1 to 16 carbon atoms. Examples of preferred cocatalysts are $Al(C_2H_5)_3$, $Al(C_2H)_2H$, $Al(C_3H_7)_3$, $Al(C_3H_7)_2H$, $Al(C_8H_{17})_3$, $Al(C_{12}H_{25})_3$, $Al(C_2H_5)(C_{12}H_{25})_2$ and $Al(iC_4H_9)(C_{12}H_{25})_2$.

Another class of suitable catalyst systems comprises Ziegler-Natta catalysts, comprising the reaction product of:
a solid component comprising a titanium compound supported on a magnesium halide in active form and optionally an electron donor compound (inside donor), and
an alkyl aluminium compound, optionally in the presence of an electron donor compound (outside donor).

Suitable titanium compounds are Ti halides (such as $TiCl_4$, $TiCl_3$), Ti alcoholates, Ti haloalcoholates. Such high-activity catalyst systems are capable of producing large amounts of polymer in a relatively short time avoiding the step of removing catalyst residues from the polymer. Suitable Ziegler-Natta catalysts are described in EP-A-4645, EP-A-89691 and EP-A-120503.

A preferred catalyst comprises the reaction product of a titanium compound, containing at least one Ti-halogen bond, supported on activated magnesium halide with a trialkyl aluminium compound, as described in EP-A-541760 and EP-A-695313. Before being introduced in the gas-phase reactor, the catalyst may be subjected to the following treatments:
precontacting the catalyst in the absence of polymerizable olefins or in the presence of said olefins in amounts smaller than 5 grams per gram of catalyst; and
prepolymerization of one or more olefins $CH_2=CHR$, where R has the meaning reported above, in amounts ranging from 10 g per g of catalyst, up to 10% of the final catalyst yield.

Other useful catalysts are the vanadium-based catalysts, which comprise the reaction product of a vanadium compound with an aluminium compound, optionally in the presence of a halogenated organic compound. Optionally the vanadium compound can be supported on an inorganic carrier, such as silica, alumina, magnesium chloride. Suitable vanadium compounds are $VCl_4$, $VCl_3$, $VOCl_3$ and vanadium acetyl acetonate.

Another family of catalysts that can be advantageously used in the process of the present invention comprises single site catalysts, i.e. compounds of a metal belonging to groups IIIA to VIIIA (IUPAC notation) of the Periodic Table of the Elements, including elements belonging to the group of the rare earth, linked with a π bond to one or more cyclopentadienyl type rings; these catalysts require a suitable activating compound, generally an alumoxane, such as those described in EP-A-129368.

As an example of single site catalysts, the "constrained geometry" catalysts can be used, such as those disclosed in EP-A-0 416 815, EP-A-0 420 436, EP-A-0 671 404, EP-A-0 643 066 and WO-A-91/04257.

Also metallocene complexes can be used as single-site catalysts, such as those described in WO-A-98/22486, WO-A-99/58539, WO-A-99/24446, U.S. Pat. No. 5,556,928, WO-A-96/22995, EP-A-485822, EP-A-485820, U.S. Pat. No. 5,324,800 and EP-A-129368. Heterocyclic metallocenes, such as those described in WO-A-98/22486 and WO-A-99/24446 can be used too.

The catalyst may be suitably employed in the form of a pre-polymer powder prepared beforehand during a pre-polymerization stage with the aid of a catalyst as described above. The pre-polymerization may be carried out by any suitable process, for example, polymerization in a liquid hydrocarbon diluent or in the gas phase using a batch process, a semi-continuous process or a continuous process.

The monomer feed obtained from step (a) of the process of the invention, containing an amount of oil lower than 8 ppm, before being fed to the gas-phase polymerization step (b), may undergo one or more further purification treatments, in one or more monomer purification units, to reduce the presence of one or more of the following contaminants:

acetylene to an amount lower than 10 ppm, preferably lower than 5 ppm and even more preferably lower than 1 ppm;

CO to an amount lower than 10 ppm, preferably lower than 3 ppm and even more preferably lower than 0.5 ppm;

$H_2O$ to an amount lower than 10 ppm, preferably lower than 5 ppm and even more preferably lower than 1 ppm; and $CO_2$ to an amount lower than 15 ppm, preferably lower than 7 ppm and even more preferably lower than 1 ppm.

A further object of the invention is a continuous gas-phase process for the homo or co-polymerization of alpha-olefin monomers comprising the following steps:

(1) passing a stream containing one or more alpha-olefin monomers through an oil filter to obtain a monomer stream comprising an amount of oil lower than 8 ppm, preferably lower than 5 ppm, more preferably lower than 1 ppm, and even more preferably between 0.001 and to 0.8 ppm;

(2) passing the monomer stream obtained from step (1) through a catalytic purification unit under hydrogenating conditions, to obtain a monomer stream comprising an amount of acetylene lower than 10 ppm, preferably lower than 5 ppm and even more preferably lower than 1 ppm;

(3) passing the monomer stream obtained from step (2) through a catalytic purification unit under oxidative conditions, to obtain a monomer stream comprising an amount of CO lower than 10 ppm, preferably lower than 3 ppm and even more preferably lower than 0.5 ppm;

(4) treating the monomer stream obtained from step (3) with molecular sieves in order to obtain a monomer stream comprising an amount of $H_2O$ lower than 10 ppm, preferably lower than 5 ppm and even more preferably lower than 1 ppm, and an amount of $CO_2$ lower than 15 ppm, preferably lower than 7 ppm and even more preferably lower than 1 ppm; and (5) continuously passing the monomer stream obtained from step (4) through a gas-phase reactor in the presence of a polymerization catalyst, under polymerization conditions.

The alpha-olefin monomer has the formula reported above, and is preferably ethylene.

The oil filter used in step (1) has the features indicated above.

The catalytic purification unit of step (2) comprises conventional hydrogenation catalysts, comprising one or more metals selected from the group consisting of Cu, Zn, Pd and Ni, and one or more supports selected from the group consisting of $Al_2O_3$, $SiO_2$, $TiO_2$ and MgO. Suitable catalysts comprise Cu and Zn, and optionally a promoter and a support. The catalyst, in its reduced form (i.e. the copper is at least partly present as Cu, in metallic form), may be obtained by treating with hydrogen, preferably in a hydrogen atmosphere, at a temperature 80 to 180° C. and at a pressure of 1 to 50 bar, a catalyst comprising:

25 to 50% wt., preferably 35 to 45% wt. CuO;
30 to 65% wt., preferably from 35 to 45% wt ZnO;
5 to 40% wt., preferably 20 to 30% wt. of $Al_2O_3$, $SiO_2$, $TiO_2$, MgO, iron oxides or mixtures thereof; and
0 to 5% wt, more preferably 0 to 1% wt, of promoters.

Suitable promoters may be potassium, sodium, manganese, chromium, cobalt, tungsten, molybdenum, nickel, iron, magnesium, calcium and mixtures thereof.

The reduced form of the catalyst can also be obtained in situ, i.e. by mixing sufficient amounts of hydrogen into the monomer stream to be purified.

Without wishing to be bound by theory, acetylene $C_2H_2$ is believed to react with hydrogen to give ethylene $C_2H_4$, while oxygen generates CuO. This step may also remove $O_2$, S, Se, As, P and $C_1$ compounds, if any, by hydrogenation and adsorption.

The catalytic purification unit of step (3) may comprise conventional hydrogenation catalysts, comprising one or more oxides of metals selected from the group consisting of Cu, Zn, Pd and Ni, and one or more supports selected from the group consisting of $Al_2O_3$, $SiO_2$, $TiO_2$ and MgO.

Suitable catalysts comprise CuO and ZnO, and optionally a promoter and a support, preferably corresponding to the catalysts described in step (2) but in the oxidized form.

The catalytic purification of step (3) may be carried out over the catalyst described above in the oxidized form, at a temperature of 70 to 110° C., preferably 80 to 95° C., and at a pressure of from 5 to 80 bar, preferably from 15 to 60 bar.

Without wishing to be bound by theory, CO is believed to react with CuO to give ethylene $CO_2$ and Cu. This step may also remove the sulphur present, if any, by converting $H_2S$ to CuS and ZnS, and adsorbing such products.

The molecular sieves suitable for step (4) of the process of the invention are conventional molecular sieves, preferably comprising alumina, aluminosilicates, aluminophosphates or mixtures thereof, having a pore size ranging from 3 to 10 A; zeolites are particularly preferred, in particular of type A or X.

The purification step (4) may be carried out at a temperature of 10 to 90° C., preferably from 20 to 40° C., at a pressure of from 5 to 80 bar, preferably from 15 to 60 bar.

This step highly removes the amount of $H_2O$ and $CO_2$, as indicated above; moreover, also MeOH, is any, may be removed.

A further object of the present invention concerns the use of an oil filter to obtain a purified ethylene stream comprising an amount of oil lower than 1 ppm, preferably from 0.001 to 0.8 ppm, wherein the purified ethylene stream is then used as monomer feed in a continuous gas-phase polymerization process.

As indicated above, without wishing to be bound by theory, it is believed that the removal of oil from the monomer feed prevents the reacting, cracking and oxidation of oil to polar components, which may poison the polymerization reaction; moreover, oil may act as a poison for the polymerization catalyst.

Finally, a further object of the present invention is the use of gaseous stream comprising ethylene as a monomer feed in a continuous gas-phase polymerization process, wherein the gaseous stream contains an amount of oil lower than 1 ppm, preferably from 0.001 to 0.8 ppm.

The process of the present invention is now described in details with reference to the attached figures, which are given for illustrative purposes not limiting the scope of the invention.

FIG. 1 shows a fluidized bed reactor comprising a reactor body 1 including a fluidized bed 2 of polymer, a fluidization plate 3 and a velocity reduction zone 4. The velocity reduction zone 4 is generally of increased diameter compared to the diameter of the fluidized bed portion of the reactor.

The fresh make-up monomer(s) are fed via line 5 to an oil filter 6 to reduce the amount of oil to an amount lower than 1 ppm, and are subsequently fed via line 7, that may be optionally used to add molecular weight regulators and inert gases. The gaseous stream leaving the top of the velocity reduction zone 4 comprises, besides the unreacted monomers, also inert condensable gases, such as isopentane, as well as inert non-condensable gases, such as nitrogen. Said gaseous stream is compressed, cooled and recycled to the bottom of the fluidized bed reactor: from the top of the velocity reduction zone 4 the gaseous stream is transferred via recycle line 8 to a compressor 9 and then to a heat exchanger 10. According to a preferred embodiment, passing through the heat exchanger 10, the gaseous stream is cooled below its dew point to form a two-phase mixture of gas and condensed liquid. Said two-phase mixture obtained at the outlet of the heat exchanger 10 is transferred to the bottom of the fluidized bed reactor via line 11, so to ensure an amount of upwardly flowing gas sufficient to maintain the bed in a fluidized condition. The catalyst, optionally subjected to the previously described precontacting and prepolymerization treatments, is fed to the reactor through a line 12, that is preferably placed in the lower part of the fluidized bed 2. The polymer can be discharged through a line 13, placed at the bottom of the fluidized bed 2.

Figure 2:
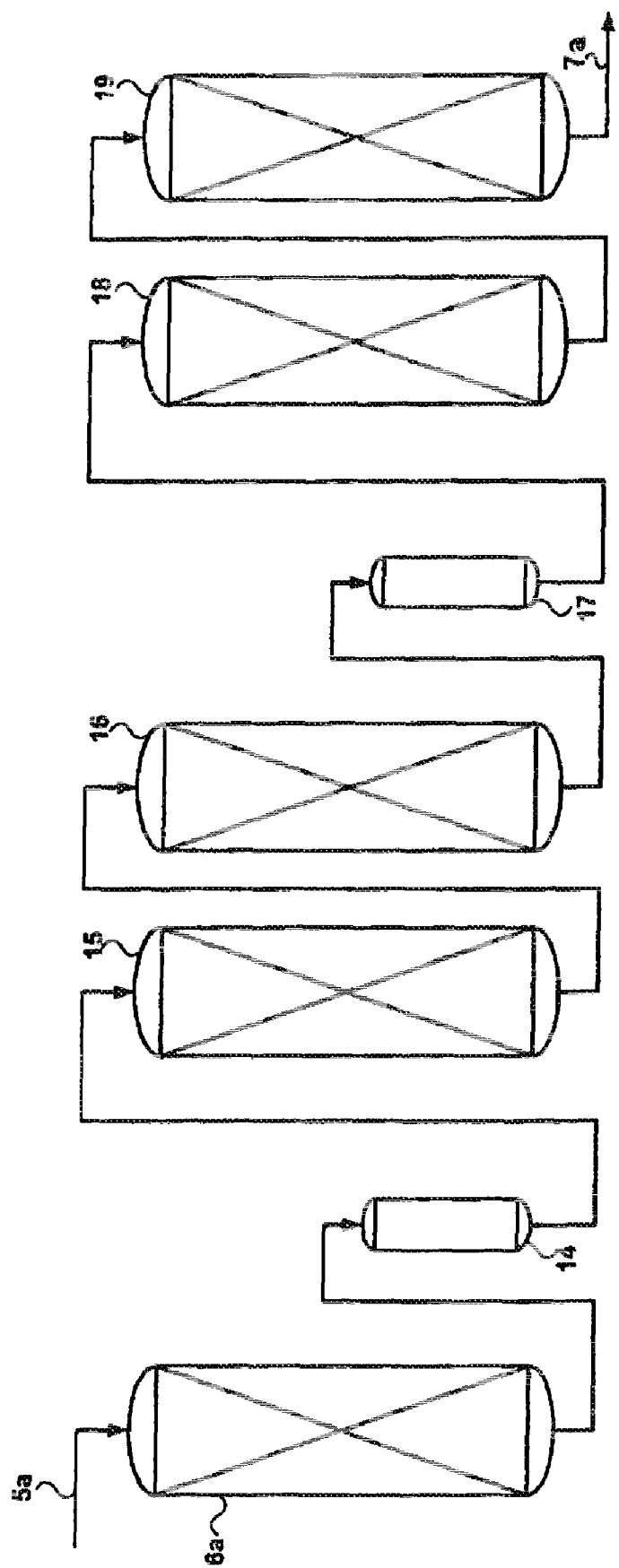
FIG. 2 illustrates a preferred configuration for the purification steps including an oil filter according to the present invention of the ethylene feed before being fed to the gas-phase polymerization reactor.

FIG. 2 shows the preferred purification steps of the ethylene feed before being fed to the gas-phase polymerization reactor. A gaseous stream comprising one or more alpha-olefin monomers is first passed via line 5a to oil filter 6a, in order to reduce the amount of oil to an amount lower than 1 ppm. The obtained gaseous stream is transferred to a heat exchanger 14 and passed through a catalytic purification unit 15 under hydrogenating conditions to hydrogenate acetylene to ethylene, and then to a catalytic purification unit 16 under oxidative conditions to convert CO to $CO_2$. The obtained gaseous stream is transferred to a heat exchanger 17, and then passed through molecular sieve units 18 and 19, to remove $H_2O$ and $CO_2$ respectively. The obtained monomer gas stream 7a is then fed to the fluidized bed reactor for polymerization.

The following analytical methods have been used to determine the properties reported in the detailed description and in the examples.
Acetylene content: Gas chromatography, DIN 51405
CO content: Gas chromatography, DIN 51405
$CO_2$ content: Gas chromatography, DIN 51405
MeOH content: Gas chromatography, DIN 51405
$O_2$ content: measured with a Process Oxygen Analyzer Platinum Series, model FAH0100SV, produced by Delta F Corp.
$H_2O$ content: measured with a Model 3050-RM Moisture Analyzer, produced by Ametek Process Instrument.

EXAMPLE 1

Preparation of the Supported Chromium Catalyst

The support used was a granular $SiO_2$ support having a surface area (BET) of 320 $m^2/g$ and a pore volume of 1.75 mL/g. Such a support is available commercially from Grace under the trade name Sylopol 332.

To 100 kg of the support there were added 141 L of a solution of $Cr(NO_3)_3 9H_2O$ in methanol (11.3 g/L), and after 1 hour the solvent was removed by distillation under reduced pressure. The resulting intermediate contained 0.2 wt % of chromium.

The said intermediate product was calcined in a vapor-phase fluidized bed. The mixture was first of all heated to 300° C. with fluidization thereof by pure nitrogen, which was subsequently replaced by air, whereupon the mixture was heated until the desired end temperature of 700° C. had been reached. The mixture was kept at the end temperature over a period of 10 hours, after which the gas was switched back to nitrogen and the mixture cooled.

EXAMPLE 2

Ethylene Purification

Ethylene was passed thorough an oil filter consisting of 3 conventional pleated, cylindrical filter cartridges CS604LGH13, i.e. liquid/gas coalescing cartridges commercialized by Pall Corporation (the casing type was LGC034C2A), operated at about 30° C. and about 15 bar; the pressure drop over the oil filter was lower than 1 bar.

The obtained ethylene stream, comprising about 0.1 ppm oil, was then passed through a catalytic column containing the catalyst PuriStar® R3-16 commercialised by BASF (comprising 40% wt CuO, 40% wt. ZnO, the rest $Al_2O_3$, in the reduced state), under hydrogenating conditions, at a temperature of 90° C. and a pressure of about 15 bar, to obtain an ethylene stream comprising 0.1 ppm acetylene and 0.005 ppm $O_2$.

The obtained ethylene stream was then passed through a catalytic column containing the catalyst PuriStar® R3-16 (in the oxidised state) commercialised by BASF, under oxidative conditions, at a temperature of 90° C. and a pressure of about 15 bar, to obtain an ethylene stream comprising 0.01 ppm CO.

Finally, the ethylene stream was passed on molecular sieves CG6731, commercialised by UOP, at a temperature of about 25° C. and at a pressure of about 15 bar, thus obtaining a stream comprising less than 0.5 ppm $H_2O$, less then 1.0 ppm $CO_2$ and less than 0.5 ppm MeOH.

EXAMPLE 3

Gas-Phase Polymerization

Polymerization was carried out in an industrial fluidized bed reactor having a diameter of 5.0 m. The reaction temperature was from 110.4° C. to 112.5° C., the pressure in the reactor 21 bar. The reactor gas had the following composition: 56 vol % of ethylene, 0.23 vol % of 1-hexene, 2 vol % of hexane and 41.77 vol % of nitrogen.

Ethylene was previously purified as described in Example 2. The catalyst used was prepared as described in Example 1.

The plant was operated regularly, without disruption of its operability, and no increase in electrostatic level and lumps formation was noticed.

COMPARATIVE EXAMPLE 1

Gas-Phase Polymerization

The operability of an industrial fluidized bed reactor for ethylene polymerization was evaluated; the plant was operated under the polymerization conditions and with the catalyst system described in Example 3. The ethylene feed was purified as described in Example 2, with the exception that the oil purification was not carried out and the ethylene feed contained an amount of oil of about 9 ppm.

After 3 years of normal operations, the operability of the plant increasingly dropped, accompanied by an evident increase in the electrostatic level in the reactor, with the consequent formation of lumps. During the $4^{th}$ year of operation, the plant required many shut down for lump formation; moreover, it was evidenced an increased need of antistatic agents and alkyls. The number of shut down of the plant, which was zero the first year of operation, increased to 11 shut downs in the fourth year of operation.

Moreover, analysis of oil levels in the purification columns of the ethylene feed gave the following results:
- a sample of the catalyst from the first catalytic purification unit showed the presence of about 700 ppm of oil and $C_{20}$-$C_{24}$ poisoning substances (detected by IR analysis);
- the analysis of molecular sieves indicated a presence of about 2450 ppm of oil and $C_{10}$-$C_{22}$ poisoning substances (detected by IR analysis); and the ethylene conduit to the gas-phase polymerization reactor was opened and showed the presence of oil on the bottom of the conduit.

After submitting the ethylene feed to the purification step (a) and (1) according to the present invention, as described in Example 2, in order to obtain an oil content of about 0.1 ppm, the plant was regularly run without unscheduled plant shut downs.

The invention claimed is:

1. A continuous gas-phase process for the polymerization of alpha-olefins, comprising the following steps:
   (a) passing a stream comprising one or more alpha-olefin monomers through an oil filter, to obtain a monomer feed comprising an amount of oil lower than 8 ppm; and
   (b) continuously passing the monomer feed obtained from step (a) through a gas-phase reactor in the presence of a polymerization catalyst, under polymerization conditions.

2. The process of claim 1, wherein the amount of oil in the monomer feed obtained from step (a) is lower than 1 ppm.

3. The process of claim 1, wherein the oil filter is a demister or liquid/gas coalescer.

4. The process of claim 1, wherein the oil filter is a liquid/gas coalesces, able to trap oil droplets having a diameter higher than 0.3 micron.

5. The process of claim 1, wherein gas-phase reactor of step (b) is a fluidized-bed reactor.

6. The process of claim 1, wherein the polymerization catalyst is a supported chromium catalyst.

7. A continuous gas-phase process for the homo or co-polymerization of alpha-olefin monomers comprising the following steps:
   (1) passing a stream containing one or more alpha-olefin monomers through an oil filter to obtain a monomer stream comprising an amount of oil lower than 8 ppm;
   (2) passing the monomer stream obtained from step (1) through a catalytic purification unit under hydrogenating conditions, to obtain a monomer stream comprising an amount of acetylene lower than 10 ppm;
   (3) passing the monomer stream obtained from step (2) through a catalytic purification unit under oxidative conditions, to obtain a monomer stream comprising an amount of CO lower than 10 ppm;
   (4) treating the monomer stream obtained from step (3) with molecular sieves in order to obtain a monomer stream comprising an amount of $H_2O$ lower than 10 ppm, and an amount of $CO_2$ lower than 15 ppm; and
   (5) continuously passing the monomer stream obtained from step (4) through a gas-phase reactor in the presence of a polymerization catalyst, under polymerization conditions.

8. The process of claim 7, wherein the amount of oil in the monomer feed obtained from step (1) is lower than 5 ppm.

9. The process of claim 8, wherein the amount of oil is lower than 1 ppm.

10. The process of claim 7, wherein the oil filter is a demister or liquid/gas coalescer.

11. The process of claim 10, wherein the oil filter is a liquid/gas coalescer, able to trap oil droplets having a diameter higher than 0.3 micron.

12. The process of claim 7, wherein the catalytic purification unit of step (2) comprises an hydrogenation catalysts comprising one or more metals selected from the group consisting of Cu, Zn, Pd and Ni, and one or more supports selected from the group consisting of $Al_2O_3$, $SiO_2$, $TiO_2$ and MgO.

13. The process of claim 7, wherein the amount of acetylene in the monomer feed obtained from step (2) is lower than 5 ppm.

14. The process of claim 7, wherein the catalytic purification unit of step (3) comprises a catalyst comprising one or more oxides of metals selected from the group consisting of Cu, Zn, Pd and Ni, and one or more supports selected from the group consisting of $Al_2O_3$, $SiO_2$, $TiO_2$ and MgO.

15. The process of claim 7, wherein the amount of CO in the monomer feed obtained from step (3) is lower than 3 ppm.

16. The process of claim 7, wherein the molecular sieves in step (4) comprise alumina, aluminosilicates, aluminophosphates or mixtures thereof and have a pore size ranging from 3 to 10 Å.

17. The process of claim 16, wherein the molecular sieves comprise a zeolite.

18. The process of claim 7, wherein the amount of $H_2O$ in the monomer feed obtained from step (4) is lower 5 ppm.

19. The process of claim 7, wherein ti amount of $CO_2$ in the monomer feed obtained from step (4) is lower than 7 ppm.

20. The process of claim 1, wherein the oil filter of step (a) is followed by at least one purification unit, before the inlet of the gas-phase reactor of step (b).

21. A continuous gas-phase process for the homo or co-polymerization of alpha-olefin monomers comprising the following steps:
   (1) passing a gas stream containing one or more alpha-olefin monomers and liquid droplets of oil having a diameter greater than 0.1 micron, through an oil filter to obtain a monomer stream comprising an amount of oil lower than 8 ppm,
      wherein the filter separates the droplets of oil having a diameter greater than 0.1 micron from the gas stream by a mechanism of inertial impaction, thereby forming the monomer stream and a trapped liquid oil stream;
   (2) passing the monomer stream Obtained from step (1) through a catalytic purification unit under hydrogenating conditions, to obtain a monomer stream comprising an amount of acetylene lower than 10 ppm;
   (3) passing the monomer stream obtained from step (2) through a catalytic purification unit under oxidative conditions, to obtain a monomer stream comprising an amount of Co lower than 10 ppm;
   (4) treating the monomer stream obtained from step (3) with molecular sieves in order to obtain a monomer stream comprising an amount of $H_2O$ lower than 10 ppm, and an amount of $CO_2$ lower than 15 ppm; and
   (5) continuously passing the monomer stream obtained from step (4) through a gas-phase reactor in the presence of a polymerization catalyst, under polymerization conditions.

* * * * *